United States Patent
Ohishi

(10) Patent No.: US 8,862,191 B2
(45) Date of Patent: Oct. 14, 2014

(54) COMMUNICATION DEVICE

(75) Inventor: Takafumi Ohishi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 413 days.

(21) Appl. No.: 13/426,272

(22) Filed: Mar. 21, 2012

(65) Prior Publication Data

US 2012/0178387 A1 Jul. 12, 2012

Related U.S. Application Data

(63) Continuation of application No. PCT/JP2010/001790, filed on Mar. 12, 2010.

(51) Int. Cl.
| | | |
|---|---|---|
| *H04M 1/00* | (2006.01) | |
| *H01Q 21/28* | (2006.01) | |
| *H01Q 9/30* | (2006.01) | |
| *H01Q 1/27* | (2006.01) | |
| *H01Q 9/38* | (2006.01) | |
| *H04B 13/00* | (2006.01) | |

(52) U.S. Cl.
CPC ............... *H01Q 21/28* (2013.01); *H01Q 9/30* (2013.01); *H01Q 1/273* (2013.01); *H01Q 9/38* (2013.01); *H04B 13/005* (2013.01)
USPC ....................... 455/575.7; 455/575.5; 455/269

(58) Field of Classification Search
USPC ........... 455/269–280, 193.1, 193.2, 129, 121, 455/107, 97, 575.7, 575.5, 562.1, 83, 63.4, 455/25, 13.3, 19; 343/723, 823, 825, 843, 343/844, 868, 891, 809
See application file for complete search history.

(56) References Cited

U.S. PATENT DOCUMENTS

| | | | | |
|---|---|---|---|---|
| 4,571,595 A * | 2/1986 | Phillips et al. | ................ | 343/745 |
| 7,248,866 B1 * | 7/2007 | Tsironis | ........................ | 455/423 |
| 7,423,598 B2 * | 9/2008 | Bit-Babik et al. | ............ | 343/702 |
| 7,983,728 B2 * | 7/2011 | Shiokawa et al. | ............. | 505/210 |
| 8,098,211 B2 * | 1/2012 | Onaka et al. | .................. | 343/866 |
| 2007/0285335 A1 * | 12/2007 | Bungo et al. | .................. | 343/895 |

(Continued)

FOREIGN PATENT DOCUMENTS

| | | |
|---|---|---|
| JP | 2003-037566 A | 2/2003 |
| JP | 2006-352318 A | 12/2006 |
| JP | 2008-120211 A | 5/2008 |
| JP | 2008-205604 A | 9/2008 |
| WO | WO2011/011120 A1 | 9/2011 |

OTHER PUBLICATIONS

International Search Report (ISR) dated Jun. 15, 2010 (and English translation thereof) issued in parent International Application No. PCT/JP2010/001790.

(Continued)

*Primary Examiner* — Lana N Le
(74) *Attorney, Agent, or Firm* — Holtz, Holtz, Goodman & Chick PC

(57) ABSTRACT

In the embodiment, a communication device is provided including a substrate, an antenna mounted on the substrate, a first communication unit which transmits or receives a first signal via the antenna, a terminal provided on the substrate, a signal wire one end of which is connected to the terminal, a conductor plate connected to the other end of the signal wire, and a second communication unit which transmits or receives a second signal via the conductor plate. A sum length of a line length of the signal wire and half a circumferential length of the conductor plate is equal to integral times of half the wavelength of the resonance frequency of the antenna.

5 Claims, 8 Drawing Sheets

(56) References Cited

U.S. PATENT DOCUMENTS

| | | | |
|---|---|---|---|
| 2010/0149069 A1* | 6/2010 | Kim ........................... | 455/575.1 |
| 2010/0265041 A1* | 10/2010 | Almog et al. ................. | 455/11.1 |
| 2010/0289709 A1* | 11/2010 | Guan ........................... | 343/702 |
| 2011/0221642 A1* | 9/2011 | Bungo et al. ................ | 455/575.1 |
| 2012/0249390 A1* | 10/2012 | Shirakawa et al. ......... | 455/277.1 |

OTHER PUBLICATIONS

International Preliminary Report on Patentability (IPRP) and Written Opinion dated Oct. 11, 2012 (in English) Issued in parent International Application No. PCT/JP2010/001790.

\* cited by examiner

COMMUNICATION DEVICE

CROSS-REFERENCE TO RELATED APPLICATION

This application is a continuation of International Application No. PCT/JP2010/001790, filed Mar. 12, 2010, the entire contents of which are incorporated herein by reference.

FIELD

Embodiments described herein relates to a communication device which performs communication via a human body.

BACKGROUND

A communication which communicates between two communication devices via a human body has been known (e.g., refer to Patent Document 1).

A communication device which performs communication via a human body is provided with a signal electrode configure to transmit and receive a signal, and a reference electrode which has a reference potential. The signal electrode electrostatically couples with the signal electrode of a communication partner by contacting with or closely approaching to the human body. The reference electrode electro-statically couples with the reference electrode of the communication partner via a space. Thus, electrical potential difference between the signal electrode and the reference electrode of the communication device is transmitted to the communication partner, so that data to be communicated is transmitted to the communication partner from the communication device.

When providing a communication device, which performs communication via a human body, for a wireless terminal, such as a cellular phone, which performs communication via an antenna, the antenna and the signal electrode are mounted on the common substrate of the wireless terminal closely to each other. When the signal electrode and the antenna are mounted closely to each other on the common substrate, there arises a problem that a part of a current flowing in the antenna flows to the signal electrode and thereby deteriorates performance of the antenna.

DETAILED DESCRIPTION

According to an embodiment, a communication device is provided including a substrate; an antenna mounted on the substrate; a first communication unit which transmits or receives a first signal via the antenna; a terminal provided on the substrate; a signal wire one end of which is connected to the terminal; a conductor plate connected to the other end of the signal wire; and a second communication unit which transmits or receives a second signal via the conductor plate, wherein a sum length of a line length of the signal wire and half a circumferential length of the conductor plate is equal to integral times of half the wavelength of the resonance frequency of the antenna.

Referring to figures appended, embodiments of the present invention will be described in detail bellow.

Embodiment 1

Figure 1:
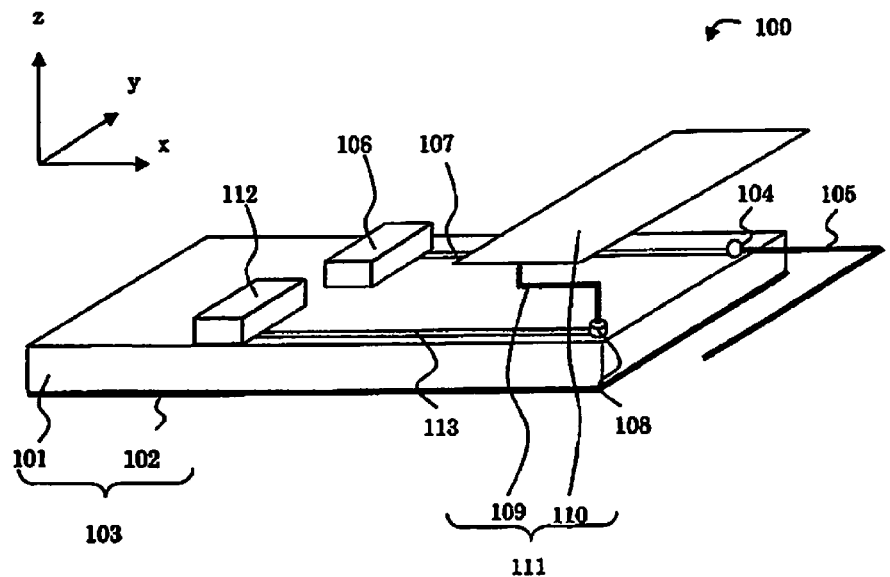
FIG. 1 is a schematic view showing a communication device according to an embodiment 1 of the present invention.

FIG. 1 is a schematic view of a communication device 100 according to an embodiment 1 of the present invention.

The communication device 100 includes a substrates 103, an antenna 105, a first communication unit 106 configured to transmit and receive a first signal via the antenna 105, a terminal 108 mounted on the substrate 103, a signal wire 109 one end of which is connected to the terminal 108; a conductor plate 110 connected to the other end of the signal wire 109, a second communication unit 112 configured to transmit and receive a second signal via the conductor plate 110. A sum length of a line length of the signal wire 109 and half a circumferential length of the conductor plate 110 is equal to integral times of half the wavelength of the resonance frequency of the antenna 105.

The substrate 103 is composed of a dielectric body portion 101 and a ground portion 102. The ground portion 102 is composed of a conductor having a reference potential, for example, such a metal layer as cooper or gold.

A power supply unit 104 is provided on the substrate 103. The antenna 105 is connected to the power supply unit 104. The antenna 105 has a resonance frequency $f_1$. FIG. 1 shows an inverted L antenna, as an example.

The first communication device 106 is provided on a face (hereinafter, referred to as one surface) on which the power supply unit 104 of the substrate 103 is provided. The first communication device 106 is connected to the power supply unit 104 via a signal wire 107. The first communication unit 106 performs signal processing on data to generate a wireless signal, and transmits the wireless signal to a communication partner (not shown) via the antenna 105. The first communication unit 106 performs signal processing on the wireless signal received via the antenna 105 to generate a reception signal. Hereinafter, the wireless signal which is transmitted and received by the first communication unit 106 is referred to as the first signal.

The conductor plate 110 is provided above the one surface of the substrate 103 in substantially parallel with the one surface. The conductor plate 110 is a plate-like element of a rectangular shape which is made of metal, such as cooper or gold. The conductor plate 110 is configured such that copper foil is pressure-bonded on a support substrate provided on the one surface of the substrate 103, and a thin protection film and the like is pasted on the copper foil. The conductor plate 110 may be pasted on a ceiling face of a housing (not showing) of the communication device 100.

The second communication unit 112 is provided on the one surface of the substrate 103. The second communication unit 112 transmits a signal to a communication partner (not shown) via the conductor plate 110 using a human body as a transmission path. The second communication unit 112 receives a signal from a communication partner (not shown). The communication partner may be the same as or different from that of the communication partner of the first communication unit 106. The signal, which is sent to and received from the communication partner by the second communication device 112, is referred to as the second signal.

The terminal 108 is provided on one surface of the substrate 103. In FIG. 1, the terminal 108 is provided at a corner of the substrate 103. A signal wire 113 connects the second communication unit 112 with the terminal 108. The signal wire 109 is covered with an insulating member around its circumference. Alternatively, the signal wire 109 may be formed by printing a conductive line pattern on a dielectric sheet. The signal wire 109 and the conductor plate 110 compose the electrode 111.

The sum of an electrical line length $L_1$ of the signal wire 109 and half the electrical length $L_2$ of the circumferential length of the conductor plate 110 (($L_1+L_2/2$) is referred to as an electrical length $L_3$ of the electrode 111) is equal to substantially half the wavelength $\lambda_1$ of the resonance frequency $f_1$ of the antenna 105. That is, the electrical length $L_3$ of the electrode 111 is expressed as follows;

$$L_3 = L_1 + (L_2/2) = \lambda_2$$

Thus, a current leaked to the substrate 103 from the current flowing from the supply unit 104 to the antenna 105 is hard to be flowed to the electrode 111, so that the deterioration of the performance of the antenna 105 is avoided.

(Operation of the Communication Device)

Figure 2:
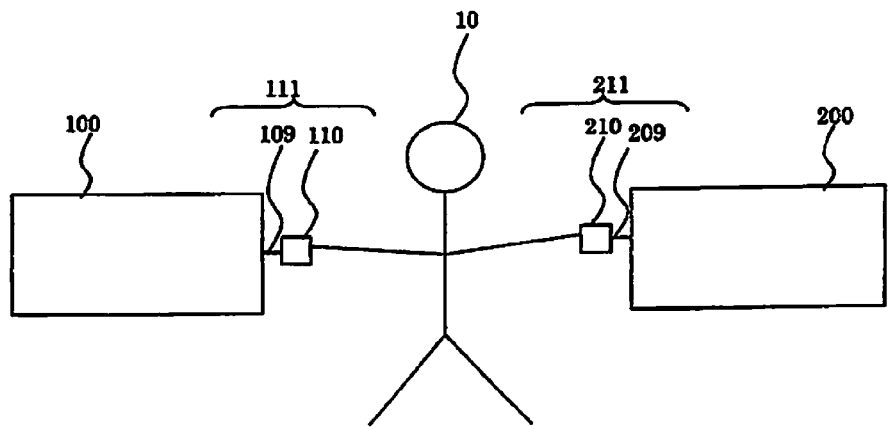
FIG. 2 is a simplified schematic view showing a communication device according to the embodiment 1 of the invention.

Next, a principle on which the communication device 100 operates will be explained, with which the second communication unit 112 communicates with the communication partner. FIG. 2 is a view which explains the communication between the communication device 100 according to the embodiment and a communication device 200, which is a communication partner. In an example shown in FIG. 2, a user (hereinafter, referred to as the human body 10) holds the communication devices 100 and 200 in hands, respectively, to make the human body 10 to be a communication path, and the communication device 100 and 200 perform communication with each other.

Here, the communication device 200 has the same configuration as that of FIG. 1, so that a detailed explanation will be omitted. The components of the communication device 200 corresponding to the conductor plate 110 and the signal wire 109 of the communication device 100 are shown as a conductor plate 210 and a signal wire 209, respectively. The conductor plate 210 and the signal wire 209 are integrally referred to as a signal electrode. Though, in FIG. 2, the conductors 110, 210 and the signal wires 109, 209 are shown outside of the communication devices 100, 200, actually, those components may be provided inside of the communication devices 100, 200. As shown in FIG. 2, the conductor plates 110, 210 and signal wires 109, 209 may be directly contacted with the human body. Even if the conductor plates 110, 210 are not directly contacted with the human body, the conductors 110, 210 may be provided close to the human body in such manner as they may be put in a pocket of clothes, for example.

When the conductor plate 110 of the communication device 100 contacts with or closely approaches the surface of the human body 10, electrostatic coupling occurs between the conductor plate 110 and the human body 10. Similarly, electrostatic coupling occurs between the conductor plate 210 of the communication device 200 and the human body 10. Thereby, the conductor plate 110 electro-statically couples with the conductor 210 via the human body 10. A ground portion 102 of the communication device 100 electro-statically couples with a ground portion of the communication device 200 of the communication partner via a space. As a result, an electrical potential difference between the conductor plate 110 and the ground portion 102 is transported to between the conductor plate 210 and the ground portion of the communication device 200. The second communication unit 112 of the communication device 100 transmits a second signal to the communication device 200 by varying the voltage applied to the conductor plate 110. The second communication unit 112 receives the second signal from the communication device 200 by detecting the variation of the electrical potential difference occurred on the conductor plate 110.

Then, an explanation will be given as to the electrical length $L_3$ of the electrode 111.

Figure 3A:
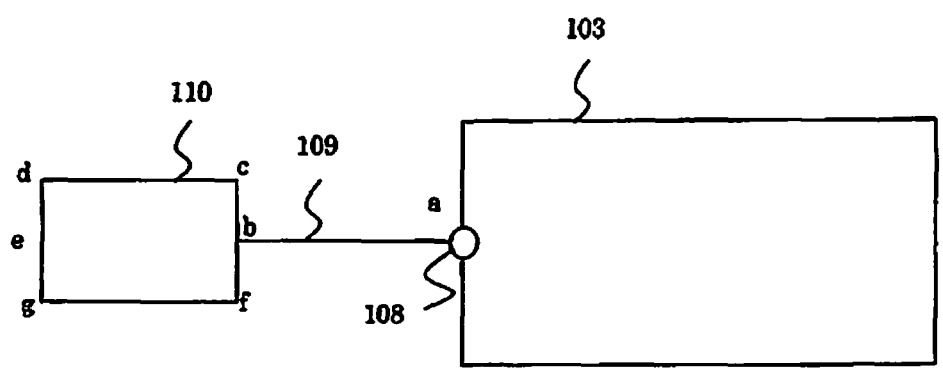
FIG. 3A is a view showing a measurement point of current amplitude of an electrode 111 shown in FIG. 1.

FIG. 3A is a developed view of FIG. 1, in which the signal wire 109 of FIG. 1 is linearly extended and the conductor plate 110 is put on the same plane as the substrate 103. Though, in FIG. 1, the terminal 108 is provided at the corner of the substrate 103, the terminal 108 may be provided on a side of the substrate 103 as shown in FIG. 3A. If the power supply unit 104 and the terminal 108 of the antenna 105 are provided on the same plane as the substrate 103, the power supply unit 104 and the terminal 108 are provided at the corner of the substrate 103 in FIG. 1, since it is better for the power supply unit 104 of the antenna 105 to be provided away from the terminal 108 as much as possible.

The sum length $L_3$ ($L_1+(L_2/2)$) of the line length $L_1$ of the signal wire 109 and half the length $L_2$ of the circumference of the conductor plate 110 is substantially equal to half the wavelength $A_1$ of the resonance frequency $f_1$ of the antenna 105.

In FIG. 3A, a connecting point between the signal wire 109 and the terminal 108 is represented as a and a connecting point between the signal wire 109 and the conductor plate 110 is represented as b. Similarly, corners of the conductor plate 110 are represented as c, d, f, g, respectively. A position at which the distance from the point b on a circumference of the conductor plate 110 becomes half the length of the circumferential length of the conductor plate 110 is represented as e. In FIG. 3A, for the purpose of explanation, b is assumed to be a middle point between points c and f, and e is assumed to be a middle point between d and g. Accordingly, the line length $L_1$ of the signal wire 109 is equal to the distance between point a and point b, the circumferential length of the conductor plate 110 $L_2$ is equal to the path length of points b→c→d→e→g→f→b.

Figure 3B:
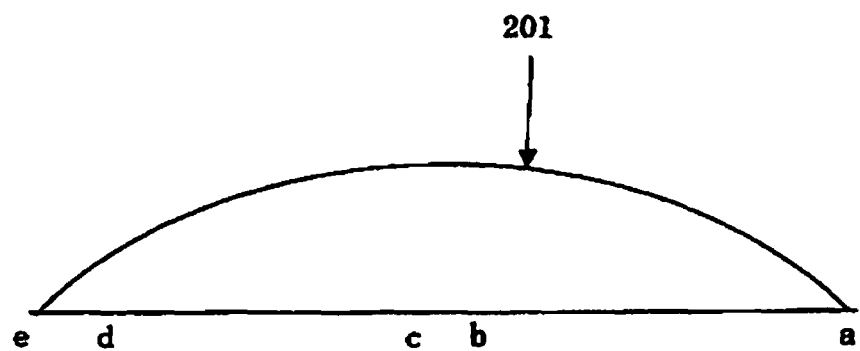
FIG. 3B is a simplified view showing current amplitude of each measurement point of the electrode 111.

FIG. 3B shows the path along the points a→b→c→d→e on the circumference of the signal wire 109 and the conductor plate 110 in a straight line. When the conductor plate 110 and the signal wire 109 is supplied with a signal having a same frequency as that of the resonance frequency $f_1$ of the antenna 105, a standing wave shown in FIG. 3B is generated. FIG. 3B shows a standing wave which generates on the path a→b→c→d→e. Amplitude of the standing wave generated on the path a→b→f→g→e is also the same as that is shown in FIG. 3B.

As shown in FIG. 3B, the standing wave having nodes at points a and e is generated on the path along the points a→b→f→g→e. The points a and e are open, and an impedance value viewing the conductor plate 110 from the point a is infinite. That is, the connection between the terminal 108 and the signal wire 109 is brought into an electrically disconnected state. Thus, the current of the resonance frequency $f_1$ which leaks from the power supply unit 104 to the substrate 103 scarcely flows to the electrode 111.

In general, the performance of an antenna is influenced by a current flowing into the antenna and a leak current flowing to the substrate. When the leak current flows into the signal line 109 and the conductor plate 110, the leak current which flows into the substrate 103 is varied and thus the characteristic of the antenna 105 is deteriorated. As shown in the embodiment, the sum of the line length $L_1$ of the signal wire 109 and half the circumferential length $L_2$ ($L_2/2$) of the conductor plate 110 ($L_1+(L_2/2)$) is equal to half the wavelength of the resonance frequency $f_1$ of the antenna 105, and thus, the impedance of the conductor plate 110 viewed from the terminal 108 can be increased. Thus the leak current flowing into the signal wire 109 is decreased and the deterioration of the characteristic of the antenna 105 can be decreased.

Figure 4:
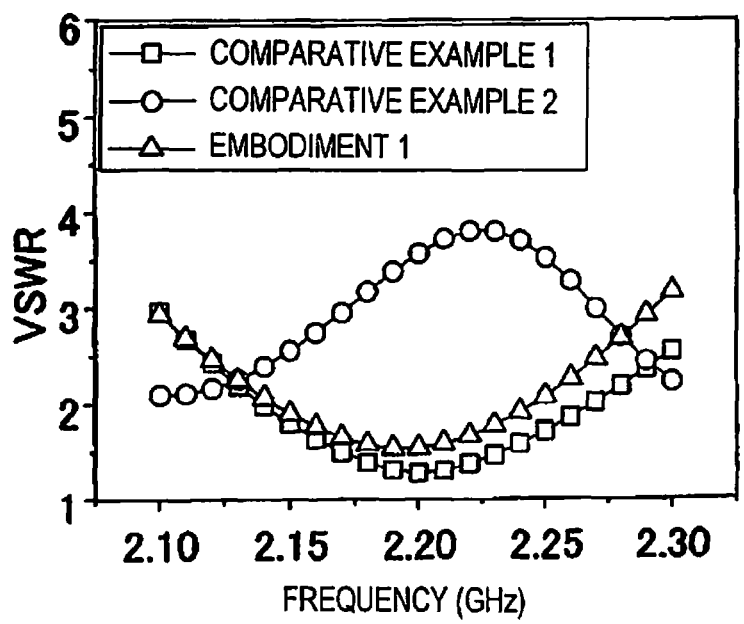
FIG. 4 is a graph showing a frequency characteristic of Voltage Standing Wave Ratio (VSWR) of an antenna 105 of the communication device according to the embodiment 1 of the present invention.

FIG. 4 is a view showing a reflection coefficient VSWR (Voltage Standing Wave Ratio) of the respective antenna 105 of the communication device shown in FIG. 1, the communication device 500 of the comparative example 1 and the communication device 600 of the comparative example 2. Generally, the smaller the VSWR is, the better the characteristic of an antenna.

Figure 5:
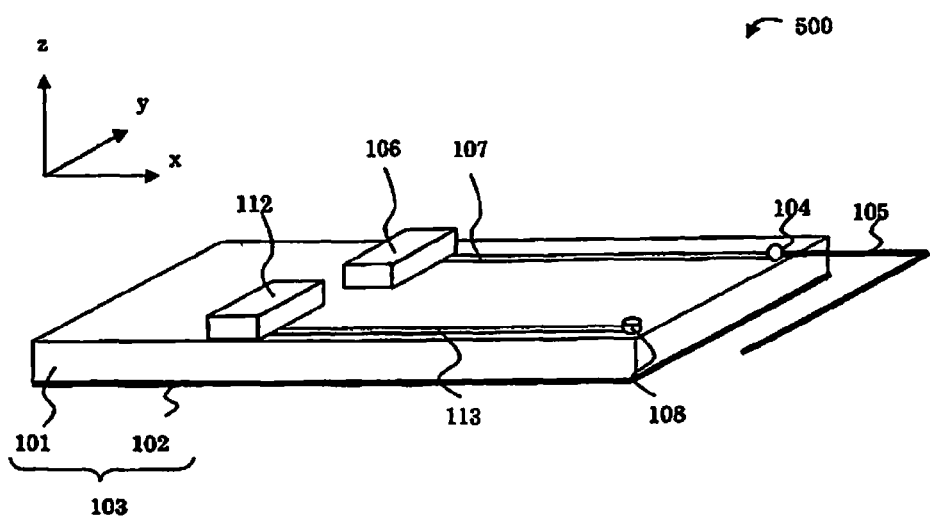
FIG. 5 is a schematic view showing a communication device according to a comparative example 1.

FIG. 5 shows the communication device 500 of the comparative example 1. As shown in FIG. 5, the communication device 500 of the comparative example 1 does not include the conductor plate 110 and the signal wire 109 of the communication device 100 in the embodiment (FIG. 1). Other configuration is the same as the communication device 100 of FIG. 1.

Figure 6:
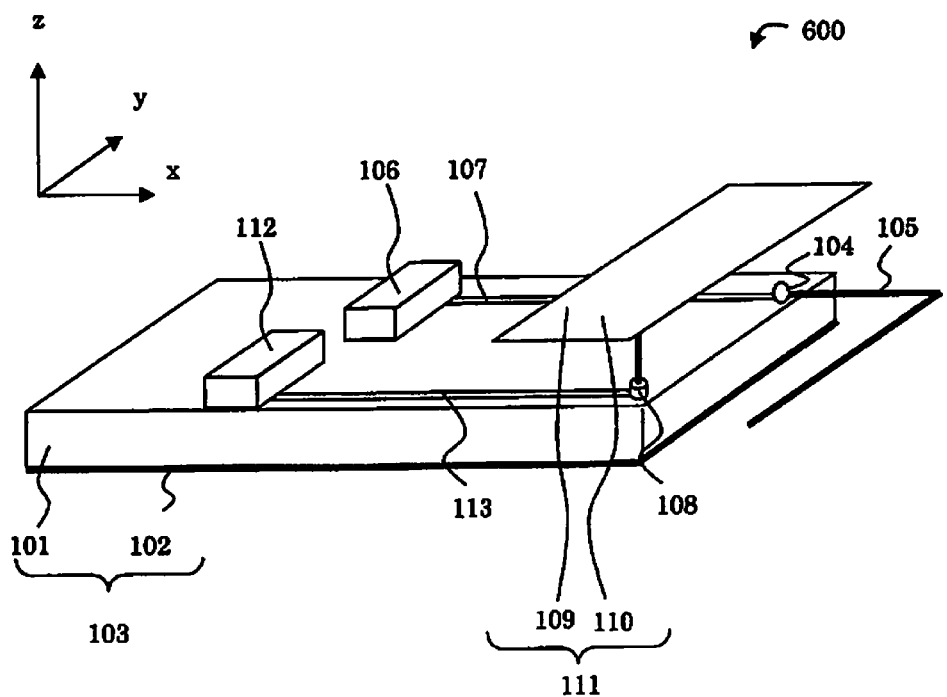
FIG. 6 is a schematic view showing a communication device according to a comparative example 2.

FIG. 6 shows the communication device 600 of the comparative example 2. The communication device 600 is different from the communication device 100 shown in FIG. 1 in that the electrical length $L_3$ of the electrode 111 does not equal to half of the wavelength $A_1$ of the resonance frequency $f_1$ of the antenna 105; however, other configuration is the same as the communication device 100.

As shown in FIG. 4, in the communication device 500 of the comparative example 1, the resonance frequency $f_1$ of the antenna is 2.20 GHz with which the VSWR is minimized, and the VSWR is not larger than 2 in a range of 2.14 GHz to 2.27 GHz.

In the case of the communication device 600 of the comparative example 2, the VSRW is equal to 2 or more in a rage 2.14 GHz to 2.27 GHz. For example, the VSRW of the communication device of the comparative example 1 is equal to 1.28 in a case where a frequency is 2.20 GHs. However, the VSWR of the communication device 600 of the comparative example 2 is equal to 3.57. That is, in the case of the communication device 600, the efficiency of the antenna deteriorates significantly in a frequency range of 2.14 GHz to 2.27 GHz in which the communication device 600 should be operated.

Meanwhile, the frequency characteristic of the VSWR hardly varies even when the electrode 111 is connected in the case of the communication device 100 according to the embodiment compared with the comparative example 1 in which the electrode 111 is not connected. For example, the VSWR of the communication device 100 of the embodiment 1 is 1.54 in the case where the frequency is 2.20 GHz, while the VSWR of the communication device 200 of the comparative example 1 is 1.28. The frequency with which the VSWR is not larger than 2 is in a range of 2.15 GHz to 2.24 GHZ, thus it is almost the same as that of the antenna of the communication device of the comparative example 1.

As described, it is understood that the characteristic deterioration in the antenna 105 can be decreased by selecting the electrical length $L_3$ of the electrode 111 to be substantially half of the wavelength $A_1$ of the resonance frequency $f_1$ of the antenna.

Although the resonance frequency of the antenna 105 is selected as 2.20 GHz in the communication device of this example, the resonance frequency is not limited to the frequency. The resonance frequency $f_1$ of the antenna 105 varies in accordance with the frequency of the signal to be used by the first communication unit 106.

Although in this embodiment, the electrical length $L_3$ of the electrode 111 is selected as substantially half the wavelength $A_1$ of the resonance frequency $f_1$ of the antenna 105, the electrical length $L_3$ may be substantially equal to the integer multiple of the half wavelength of the resonance frequency $f_1$ of the antenna 105. That is, the node of the standing wave to be generated at the electrode 111 (on the path along the points a→b→f→g→e in FIG. 3) may be at the point a, and the electrical length $L_3$ of the electrode 111 may be expressed by $L_3=L_1+(L_2/2)=A\times\lambda_1/2$ (A is an integer larger than 1).

Although the conductor plate 110 is provided over the substrate in substantially parallel with the surface of the substrate 103 in the communication device 100 of FIG. 1, the embodiment is not limited to such configuration. For example, the conductor plate 110 may be arranged so as to be parallel with the side surface (a surface orthogonal to the one surface) of the substrate 103.

The electrical length $L_3$ of the electrode 111 changes according to a distance from and a relationship with the substrate 103 or to a material of a member to fix the electrode 111, etc. Accordingly, when adjusting the electrical length, physical lengths of the signal wire 109 and the conductor plate 110 are adjusted taking these factors into consideration.

Embodiment 2

Figure 7:
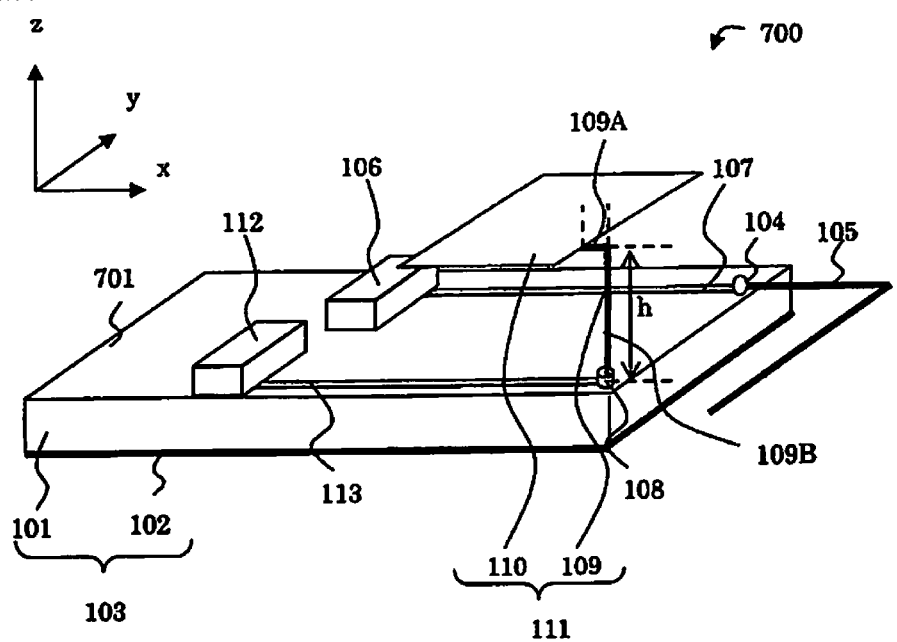
FIG. 7 is a schematic view showing a communication device according to an embodiment 2 of the present invention.

FIG. 7 shows a communication device 700 according to an embodiment 2 of the present invention.

The communication device 700 of the embodiment is connected to a terminal 108 through a signal wire 109 which is provided perpendicular to one surface 701 of a substrate 103. Here, the one surface 701 is the surface of the substrate on which an antenna 105, etc., are provided.

The signal wire 109 has a first wire 109A one end of which is connected to a conductor plate 110 and provided in parallel with the one surface 701, and a second wire 109B one end of which is connected to the terminal 108 and the other end of which is connected to the other end of the first wire 109A. A second wire 109B is a wire with a line length h, and provided perpendicular to the one surface. That is, the signal wire 109 has a shape which is bent parallel to the one surface 701 of the substrate 103 at the height h that is a distance to the one surface 701 of the substrate 103. Here, when the wavelength of the resonance frequency $f_1$ of the antenna 105 assumed to be $λ_1$, the line length h of the second wire 109B is selected as not longer than $0.30λ_1$. Although the line length of the second wire 109B is selected as h, the line length of the second wire 109B may be set longer than h if the distance between the first wire 109A and the one surface is h. In this case, the second wire 109B is not perpendicular to the one surface, but is oblique to the one surface.

The conductor plate 110 is provided in parallel with the one surface 701 of the substrate 103. The distance between the conductor plate 110 and the one surface 701 is equal to the line length h of the second wire 109B. Other configuration is the same as the communication device 100 of FIG. 1, thus the explanation thereof will be omitted.

The electrical length of the electrode 111 of the communication device 700 is selected as substantially half the wavelength $A_1$ of the resonance frequency $f_1$ of the antenna 105, so that the leak current having the resonance frequency $f_1$ does not flow into the electrode 111.

However, there is a case that a current of other frequency flows into the substrate 103. For example, let's consider a case that a current of a frequency $f_2$ which is substantially half the resonance frequency $f_1$ of the antenna 105 flows into the substrate 103. At this time, the electrical length $L_3$ of the electrode 111 is equal to $λ_2/4$ if the wavelength of the frequency $f_2$ is $λ_2$. Thus, the electrode 111 becomes a monopole antenna which operates at the frequency $f_2$. Then, the electrode 111 emits the radio wave with the frequency $f_2$ and results in a noise source both inside and outside of the communication device.

Figure 8:
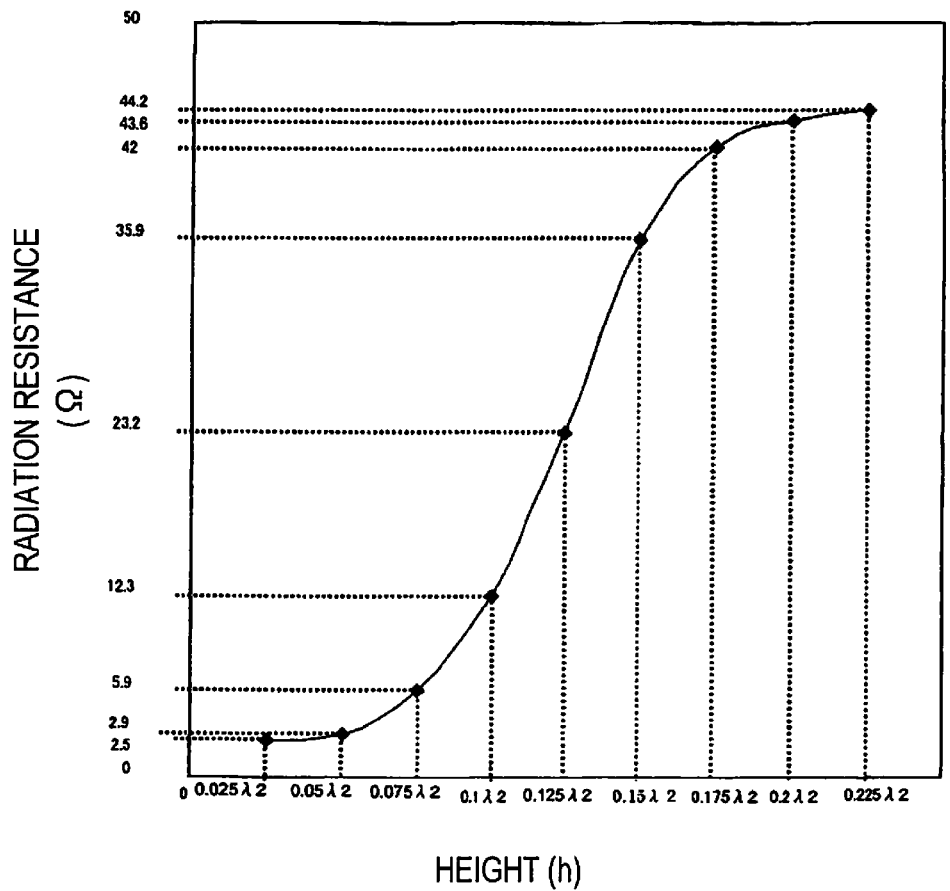
FIG. 8 is a view showing a relationship between a height of the electrode and a radiation resistance value of the communication device according to the embodiment 2 of the present invention.

FIG. 8 shows a result of a calculation of a radiation resistance value when the current at the frequency $f_2$ (wavelength $λ_2$) is flowed into the electrode 111 and the line length h of the second wire 109B of FIG. 7 is varied. In FIG. 8, a lateral axis of a graph indicates the line length h and a longitudinal axis indicates a radiation resistance value (Ω). Here, radiation amount of the radio waves becomes largest when the radiation resistance value equals 50Ω. The smaller the radiation resistance value becomes than 50Ω, the smaller the radiation amount of the radio waves becomes. The larger the radiation resistance value becomes than 50Ω, the smaller the radiation amount of the radio waves becomes.

As can be seen in FIG. 8, it is clear that the radiation resistance value is rapidly deteriorated when the height h becomes $0.15λ_2$ or less. Accordingly, when the height h becomes $0.15λ_2$ or less, it is possible to reduce the radiation amount radiated from the electrode 111 (the signal wire 109 and the conductor plate 110).

As mentioned above, the same effect as that of the embodiment 1 can be obtained according to the embodiment and the communication device according to the embodiment can reduce the radiation amount of the radio waves radiated from the signal wire 109 and the conductor plate 110 by selecting the distance h between the first wire 109A and the one surface 701 of the substrate 103 as $0.3 Å_1$ ($0.15 Å_2$) or less as well as.

Embodiment 3

Figure 9:
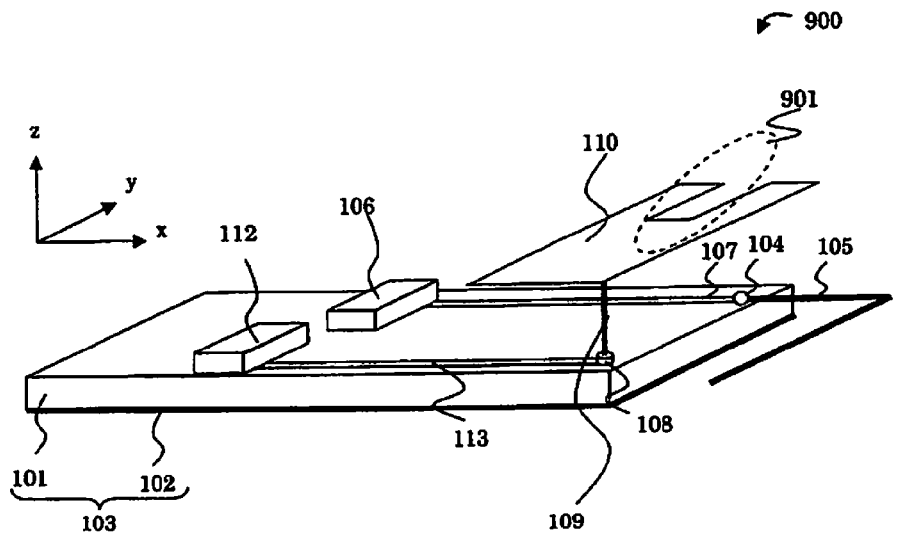
FIG. 9 is a schematic view showing a communication device according to an embodiment 3 of the present invention.

FIG. 9 shows a communication device 900 according to an embodiment 3 of the present invention. The communication device 900 of the embodiment 3 has a cut portion 901 on a conductor plate 110.

The electrical length of an electrode 111 becomes shorter than substantially half the wavelength $λ_1$ of the resonance frequency $f_1$ of an antenna 105 if the size of a conductor plate 110 and a length of a signal wire 109 are not sufficiently obtained due to the mounting difficulty, for example. In such a case, it is possible to make the circumference length of the conductor plate 110 longer by providing the cut portion 901 on the conductor plate 110 to select the electrical length of the electrode 111 as substantially half of the wavelength $λ_1$.

According to the communication device according to the embodiment 3, it is possible to achieve the same effect as that of the communication device of the embodiment 1.

Here, the communication device 900 of FIG. 9 may be further provide with a switch, with which an open end portion of the cut portion 901 is switched between a short-circuit state and open-circuit state. The communication device 900 may be further provided with a variable capacitance element at the cut portion 901. The electrical length of the electrode 111 can be adjusted by adjusting the electrical length of the cut portion 901 through the switching between the short-circuit and open-circuit state at the opening end portion by means of the switch or through varying the capacitance of the variable capacitance element. For example, if the antenna 105 is a multi-resonance antenna which has a plurality of resonance frequencies, the electrical length of the electrode 111 can be adjusted in accordance with the frequency of the radio wave emitted from the antenna 105.

Embodiment 4

Figure 10A:
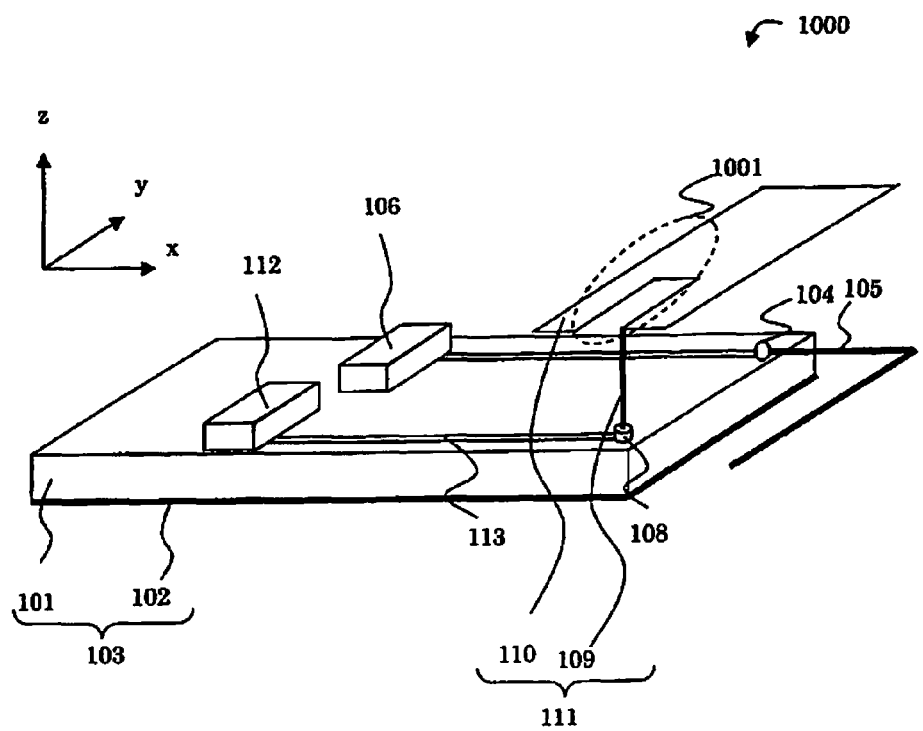
FIG. 10A is a schematic view showing a communication device according to an embodiment 4 of the present invention.
Figure 10B:
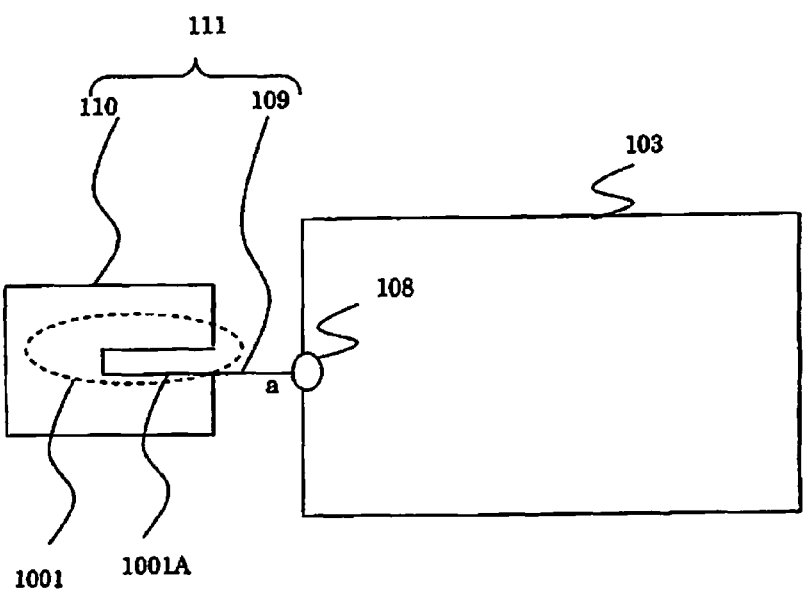
FIG. 10B is a schematic view showing a configuration of an electrode of a communication device according to the embodiment 4 of the present invention.

FIG. 10A is a schematic view showing a communication 1000 according to an embodiment 4 of the present invention. FIG. 10b is a view in which a substrate 103, a conductor plate 110 and a signal wire 109 of the communication device 1000 of FIG. 10A are provided on the identical plane.

As shown in FIG. 10A and FIG. 10B, a cut portion 1001 is provided in the conductor plate 110 of the communication device 1000 of the embodiment 4. A point at which the cut portion 1001 is connected to a one side of the conductor plate 110, which is separated by the cut portion 1001, is referred to as an open end. One end of the signal wire 109 is connected with a terminal 108 and the other end is connected with the open end. A point at which the side 1001A of the cut portion 1001 is connected to the side of the conductor plate 110 and a point at which the side 1001B is connected to the side of the conductor plate 110 are the open ends; however, either of the open ends may be connected to the signal wire 109.

An antenna 105 of the communication device 1000 of FIG. 10A is a multi-resonance antenna configured to operate at two resonance frequencies $f_1$ and $f_3$ which are related to each other expressed as $f_1 > 2 \times f_3$. As shown in FIG. 10B, the cut portion 1001 is a linear slit with a predetermined width, when the wavelength of a resonance frequency $f_3$ of the antenna 105 is assumed as $λ_3$, lengths of sides 1001A or 1001B of the cut portion should be selected as $λ_3/4$.

A line length of the signal wire 109 is assumed as $λ_3/2$. Other configuration is the same as that of the communication device of the example 1, so that explanation thereof will be omitted. Since an electrical length of an electrode 111 of the communication device 1000 of FIG. 10A is ½ of a wavelength $λ_1$ of the resonance frequency $f_1$, the characteristic deterioration of the antenna 105 can be reduced in the same way as in the embodiment 1 when the antenna 105 operates at the resonance frequency $f_1$.

Further, the characteristic deterioration in the antenna 105 can be reduced too in the case where the antenna 105 operates at the resonance frequency $f_3$. Hereinafter, the reason will be explained.

Figure 10C:
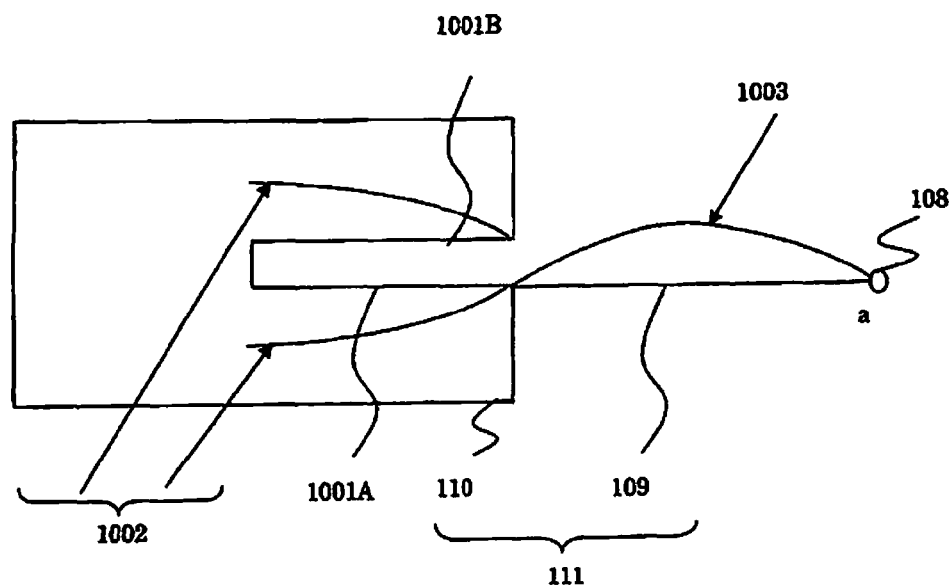
FIG. 10C is a simplified schematic view explaining current amplitude on a cut portion formed on a conductor plate of the communication device according to the embodiment 4 of the present invention.

FIG. 10C is a view showing distribution of the current flowing through the cut portion 1001 and the signal wire 109.

Lengths of the sides 001A, 1001B of the cut portion 1001 are $\lambda_3/4$. Thus, the sum of the lengths of the side 1001A and the side 1001B is $\lambda_3/2$. As shown in FIG. 10C, the sides 1001A, 1001B generate standing waves in which the open ends become nodes. The connection portion of the conductor plate 110 and the signal wire 109 is open. Moreover, a standing wave is generated on the signal wire 109 having nodes at the both ends of the signal wire 109, thereby the both ends of the signal wire 109 being open, since the electrical length of the line of the signal wire 109 is $\lambda_3/2$.

As a result, the conductor plate 110 is electrically disconnected from the signal wire 109, and the signal line 109 is electrically disconnected from the terminal 108, when the resonance frequency of the antenna 105 is $f_3$. Thus, the current of the frequency $f_3$ hardly flows to the electrode 111.

As described above, the communication device of the embodiment provides the same effect as in the embodiment 1. Further, according to the present embodiment, the characteristic deterioration of the antenna 105 can be reduce by adjusting the length of the signal wire 109, the cut portion 1001 and the size of the circumferential electrical length of the conductor plate 110, even when the antenna 105 multi-resonates at two frequencies.

Here, though a multi-resonance antenna is used as the antenna 105 in the embodiment described, it is possible to reduce the characteristic deterioration of the two antennas even when the communication device 1000 has two antennas, one of which operates at the resonance frequency $f_1$ and the other of which operates at the resonance frequency $f_3$.

A switch may be provided for the cut 1001 of the communication device 1000 as in the embodiment 3. The characteristic deterioration of the antenna 105 can be reduced even when the antenna 105 operates at 3 or more frequencies by operating the switch on and off depending on the resonance frequency of the antenna 105. The characteristic deterioration of the antenna which operates at 3 or more frequencies may be reduced by providing the cut portion 1001 with a variable capacitance element instead of the switch and by varying the capacity of the capacitance element.

Embodiment 5

Figure 11:
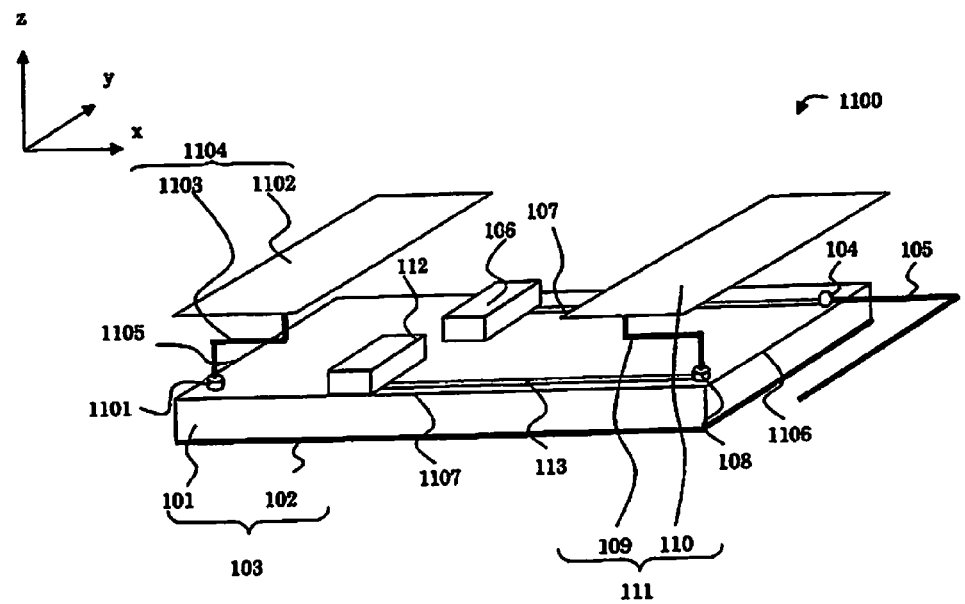
FIG. 11 is a schematic view showing a communication device according to an embodiment 5 of the present invention.

FIG. 11 is a schematic view showing a communication device 1100 according to an embodiment 5 of the present invention. The communication device 1100 of FIG. 11 further has a second terminal 1101 a second conductor plate 1102 and a second signal wire 1103 in addition to the configuration of the communication device of the embodiment 1.

A terminal 108 of the communication device 1100 is provided at a position along a short side 1106 of a substrate 103 and near a long side 1107. The terminal 108 may be provided at a position along a long side 1107 and near the short side 1106. The second terminal 1101 is mounted on one surface of the substrate 103, and it is short-circuited to a ground portion 102 by means of a through hall although not illustrated in FIG. 11. The second terminal 1101 is provided at a position along a short side 1105 facing the short side 1106 and near the long side 1107. The second terminal 1101 may be provided at a position along the long side 1107 and near the short side 1105, or may be provided along the short side 1105 and near the side facing the long side 1107. That is, the second terminal 1101 is provided at the corner portion of the short side other than the short side on which the terminal 108 is provided.

The second signal wire 1103 is connected with the second terminal 1101, thereby electrically connected with the ground portion 102. The second conductor plate 1102 is connected with the second signal wire 1103.

The second signal wire 1103 and the second conductor plate 1102 compose a second electrode 1104. The second electrode 1104 has the same configuration as the electrode 111 except that it is connected to the ground portion 102. An area of the ground portion 102 is expanded by providing the second electrode 1104 connected to the ground portion 102, thereby obtaining a stable reference potential. For example, in a case of portable equipment, the reference potential can be stabilized by providing the second electrode 1104 even if the area of the ground portion is small.

As described above, the terminal 108 is provided on the short side 1106 of the substrate 103, and the second terminal 1101 is provided on the short side 1105 facing the short side 1106 of the substrate 103. That is, the electrode 111 and the second electrode 1104 are provided on the opposite side being spaced from each other along the longitudinal direction (X direction in FIG. 11) of the substrate, respectively, so as to make the distance between the electrode 111 and the second electrode 1104 wide. It is possible to suppress coupling between both electrodes, thereby suppressing the reduction of the potential difference between the electrode 111 and the reference potential by having the distance between the electrode 111 and the electrode 1104 wide.

The second electrode 1104 has the same configuration as that of the electrode 111. Accordingly, the electrical length of the second electrode 1104 is substantially equal to the integer multiple of the half wavelength $\lambda_1$ of the resonance frequency $f_1$ of the antenna 105, when the length of the line of the second signal wire 1104 is equal to the sum of the electrical length of the line of the second signal wire 1103 and half the electrical length of the circumference of the second conductor plate 1102.

According to the communication device 1100 of the embodiment 5, the performance of the antenna 105 is not deteriorated due to the similar reason as has been explained on the embodiment 1, since the leak current flow into the substrate from the antenna 105 hardly flows into either the first electrode 111 and the second electrode 1104.

Although the second electrode 1104 has the same configuration as the electrode 111, it is not necessarily. It is enough for the configuration to satisfy the conditions that the electrical length of the electrode of the second electrode 1104 is substantially equal to the integer multiple of the half wavelength $\lambda_1$ of the resonance frequency $f_1$ of the antenna 105.

Embodiment 6

Figure 12:
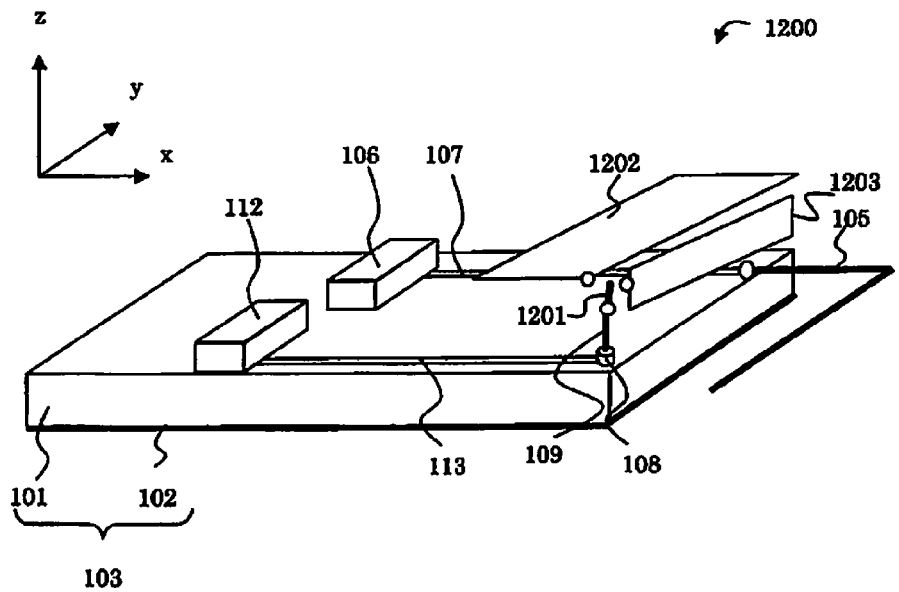
FIG. 12 is a schematic view showing a communication device according to an embodiment 6 of the present invention.

FIG. 12 is a schematic view showing a communication device 1200 of an embodiment 6. The communication device 1200 of FIG. 12 differs from the communication device of the embodiment 1 in that the communication device 1200 is provided with two conductor plates 1202, 1203, and provided with a switch 1201 that connects a signal wire 109 to either the conductor plate 1202 or the conductor plate 1203. As shown in FIG. 12, the conductor plate 1203 has a circumferential length that is different from that of the conductor 1202. The switch 1201 is controlled by a control unit (not shown). Other configurations are the same as those of the communication device of the embodiment 1.

The antenna 105 is a multi-resonance antenna that operates at two resonance frequencies $f_1$, $f_2$.

The conductor plate 1202 is provided in parallel with a substrate 103 and is connected with a terminal 108 via the switch 1201 and the signal wire 109. Here, an electrode referred to as a third electrode is formed by combining the conductor plate 1202 and the signal wire 109. The sum of half the electrical length of the circumference of the conductor 1202 and the electrical length of the line of the signal wire 109 is the electrical length of the second electrode. The conductor plate 1202 is designed so as to substantially equal to the integer multiple of the half wavelength $\lambda_1$ of the resonance frequency $f_1$ of the antenna 105.

The conductor plate 1203 is provided perpendicular to the one face of the substrate 103, and connected with the terminal 108 via the switch 1201 and the signal wire 109. Here, an electrode referred to as a fourth electrode is formed by combining the conductor plate 1203 and the signal wire 109. The sum of half the electrical length of the circumference of the conductor 1203 and the line of the signal wire 109 forms the electrical length of the fourth electrode. The conductor 1203 is designed so that the electrical length of the fourth electrode is substantially integer times half the of the wavelength $\lambda_1$ of the resonance frequency $f_4$ of the antenna 105.

When a first communication unit 106 establishes a communication, a control unit (not shown) controls the switch 1201 depending on the frequencies $f_1$, $f_4$ of a first signal to be transmitted and received by the first communication unit 106.

In a case where the frequency of the first signal is $f_1$, the switch 1201 connects the signal wire with the conductor plate 1202. The electrical length of the third electrode is equal to the integer multiplied by half the wavelength of the resonance frequency $f_1$ of the antenna 105. Because of the same reason as that of the embodiment 1, the characteristic deterioration of the antenna 105 can be reduced since a leak current that from the antenna 105 to the substrate hardly flows to the third electrode.

In a case that the frequency of a first signal is $f_4$, the switch 1201 connects the signal wire 109 with the conductor plate 1203. The electrical length of a fourth electrode (the sum of the electrical length of the line of the signal wire 109 and half the electrical length of the circumference of the conductive plate 1203) is equal to the integer multiple of the half wavelength of the resonance frequency $f_4$ of the antenna 104. Because of the same reason that of the embodiment 1, the characteristic deterioration in antenna 105 can be reduced since the leak current from the antenna 105 to the substrate hardly leaks to the fourth electrode.

As explained above, according to the communication device of the embodiment, even when the antenna operates at two different resonance frequencies, integer times half the wavelength of the resonance frequency can be matched with the electrical length of the electrode by connecting the signal wire to conductor plates which have different circumferential lengths depending on the resonant frequencies of the antenna. As a result, the same effect as that of the embodiment 1 can be obtained. Thus, signal can be emitted from the antenna without being affected by the conductor plates by using a plurality of conductor plates, even if there is a plurality of resonance frequencies of the antenna.

Here, although the surface of the conductor plate 1203 is provided perpendicular to the upper surface of the substrate 103 in the communication device of the embodiment, the conductor 1203 is not limited to the arrangement shown.

Further, although the antenna 105 operates at two resonance frequencies in the communication device of the embodiment, the antenna may operate at 3 or more resonance frequencies. In that case, a plurality of conductor plates may be provided depending on the number of the resonance frequencies.

Here, the invention is not limited to the specific details and representative embodiments shown and described herein, and in an implementation phase, this invention may be embodied in various forms without departing from the spirit or scope of the general inventive concept thereof. Various types of the invention can be formed by appropriately combining a plurality of constituent elements disclosed in the foregoing embodiments. Some of the elements, for example, may be omitted from the whole of the constituent elements shown in the embodiments mentioned above. Further, the constituent elements over different embodiments may be appropriately combined.

What is claimed is:

1. A communication device, comprising:
   a substrate;
   an antenna provided on the substrate;
   a first communication unit which transmits or receives a first signal via the antenna;
   a terminal provided on the substrate;
   a signal wire one end of which is connected to the terminal;
   a conductor plate connected to the other end of the signal wire; and
   a second communication unit which transmits and receives a second signal via the conductor plate, wherein the sum of an electrical length of a line of the signal wire and half the electrical length of the circumference of the conductor plate is equal to integer multiple of half a wave length of a resonance frequency of the antenna.

2. The communication device according to claim 1, wherein the conductor plate is provided in parallel with the surface having a distance from the surface of 0.30 or less wavelength of the resonance frequency of the antenna.

3. The communication device according to claim 2, wherein
   the antenna operates at the resonance frequency and a second resonance frequency which is different from the resonance frequency,
   the conductor plate is provided with a cut portion having a side length substantially equal to ¼ of the wave length of the second resonance frequency,
   the other end of the signal wire is connected to an open end of the cut portion, and
   the line length of the signal wire is substantially equal to half the wavelength of the second resonance frequency.

4. The communication device according to claim 3, wherein
   the substrate is provided with a ground portion having a reference potential,
   the terminal is provided on a side of the substrate,
   the communication device further comprising
   a second terminal which is provided on a side facing the side provided the terminal and which is connected to the ground portion;
   a second signal wire one end of which is connected to the second terminal, and
   a second conductor plate connected to the other end of the second signal wire, wherein
   the sum of the line length of the second signal wire and half the circumferential length of the second conductor is equal to the integer multiple of the half wavelength of the resonance frequency of the antenna.

5. The communication device according to claim 4 further comprising:
   a third conductor plate which has a circumferential length different from the conductor plate; and
   a switch which electrically connects the signal wire to either the conductor plate or the third conductor plate.

* * * * *